United States Patent
Nachenberg

(10) Patent No.: US 8,499,150 B1
(45) Date of Patent: Jul. 30, 2013

(54) SELECTIVELY TRUSTING SIGNED FILES

(75) Inventor: Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 197 days.

(21) Appl. No.: 12/944,429

(22) Filed: Nov. 11, 2010

(51) Int. Cl.
*H04L 29/06* (2006.01)
*H04L 9/32* (2006.01)
*G06F 9/00* (2006.01)
*G06F 15/16* (2006.01)
*G06F 17/00* (2006.01)
*G06F 11/00* (2006.01)
*G06F 12/14* (2006.01)
*G06F 12/16* (2006.01)
*G08B 23/00* (2006.01)

(52) U.S. Cl.
USPC ........... 713/158; 713/156; 713/176; 713/178; 726/11; 726/22; 726/24; 726/25

(58) Field of Classification Search
USPC ................ 713/156, 168, 173, 175, 176, 180, 713/188, 189; 709/220, 225, 229; 380/30; 705/39, 40, 44; 726/4, 22, 24, 26
See application file for complete search history.

(56) References Cited

U.S. PATENT DOCUMENTS

| | | | |
|---|---|---|---|
| 7,047,404 B1 * | 5/2006 | Doonan et al. | 713/156 |
| 7,577,609 B1 * | 8/2009 | Maher | 705/39 |
| 7,974,952 B1 * | 7/2011 | Reitmeyer et al. | 707/641 |
| 2004/0162985 A1 * | 8/2004 | Freeman et al. | 713/176 |
| 2005/0137898 A1 * | 6/2005 | Wood et al. | 705/1 |
| 2006/0095971 A1 * | 5/2006 | Costea et al. | 726/26 |
| 2007/0168657 A1 * | 7/2007 | Carro | 713/156 |
| 2007/0260738 A1 * | 11/2007 | Palekar et al. | 709/229 |
| 2008/0155691 A1 * | 6/2008 | Fossen et al. | 726/22 |
| 2010/0313268 A1 * | 12/2010 | Abdulhayoglu et al. | 726/24 |

OTHER PUBLICATIONS

Larry Seltzer, "Securing your private keys as best practice for code signing certificates."*

* cited by examiner

*Primary Examiner* — Andrew L Nalven
*Assistant Examiner* — Huan V Doan
(74) *Attorney, Agent, or Firm* — Fenwick & West LLP

(57) ABSTRACT

A security module on a client detects a signed file at the client and reports signing information identifying a certificate used to sign the file and a file identifier identifying the file to a security server. The security server uses the signing information to determine whether the certificate is compromised. If the certificate is compromised, the security server compares a discovery date of the file with a compromise date of the certificate. The security server generates trust data assigning a trust level to the file responsive to the comparison. The trust data assign a low trust level to the file if the comparison indicates that the file discovery date is after the compromise date and assign a high trust level to the file if the comparison indicates that the file discovery date is not after the compromise date. The security server provides the trust data to the client.

15 Claims, 5 Drawing Sheets

SELECTIVELY TRUSTING SIGNED FILES

BACKGROUND OF THE INVENTION

1. Field of the Invention

This invention pertains in general to computer security and in particular to providing security in environments having digitally-signed files.

2. Description of the Related Art

There is a wide variety of malicious software (malware) that can attack modern computers. Malware threats include computer viruses, worms, Trojan horse programs, spyware, adware and crimeware. Modern malware is often designed to provide financial gain to the attacker. For example, malware can surreptitiously capture important information such as logins, passwords, bank account identifiers, and credit card numbers. Similarly, malware can provide hidden interfaces that allow the attacker to access and control the compromised computer.

Attackers often camouflage malware by making the malware appear to be legitimate. Security software often implicitly trusts digitally-signed software. The signature identifies the entity that created the software and proves that the file containing the software has not been modified since signing. Therefore, the security software assumes that signed software does not contain malware and gives the software a low level of scrutiny. Attackers can obtain signing certificates through fraud or theft and use the certificates to sign files containing malware, thereby defeating the security software.

A certificate authority can revoke a certificate that is misused to sign malware. When notified of a revoked certificate, security vendors must decide how to evaluate software signed using the certificate. One possible technique is to no longer trust any files signed with the revoked certificate. However, this technique can result in false positive malware detections since legitimate files signed using the certificate might be detected as malware once the certificate trust is negated. Another possible technique is to continue to trust files signed with the revoked certificate. This second technique, however, can result in false negative malware detections since malware signed using the certificate will be trusted. Thus, there is a need for a way to handle revoked certificates that does not suffer from these drawbacks.

BRIEF SUMMARY

The above and other needs are met by a method, computer-readable medium, and computer for assigning a trust level to a digitally-signed file. An embodiment of the method comprises receiving signing information identifying a certificate used to sign the file and determining whether the certificate is compromised. Responsive to determining that the certificate is compromised, the method compares a discovery date of the file with a compromise date of the certificate. The method further generates trust data assigning the trust level to the file responsive to the comparison.

An embodiment of the computer-readable medium comprises a non-transitory computer-readable storage medium storing executable computer program instructions for assigning a trust level to a digitally-signed file. The instructions comprise instructions for receiving signing information identifying a certificate used to sign the file and determining whether the certificate is compromised. The instructions further comprise instructions for comparing a discovery date of the file with a compromise date of the certificate responsive to determining that the certificate is compromised and generating trust data assigning the trust level to the file responsive to the comparison.

An embodiment of the computer comprises a non-transitory computer-readable storage medium storing executable computer program instructions for assigning a trust level to a digitally-signed file. The instructions comprise instructions for receiving signing information identifying a certificate used to sign the file and determining whether the certificate is compromised. The instructions further comprise instructions for comparing a discovery date of the file with a compromise date of the certificate responsive to determining that the certificate is compromised and generating trust data assigning the trust level to the file responsive to the comparison. The computer further comprises a processor for executing the computer program instructions.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
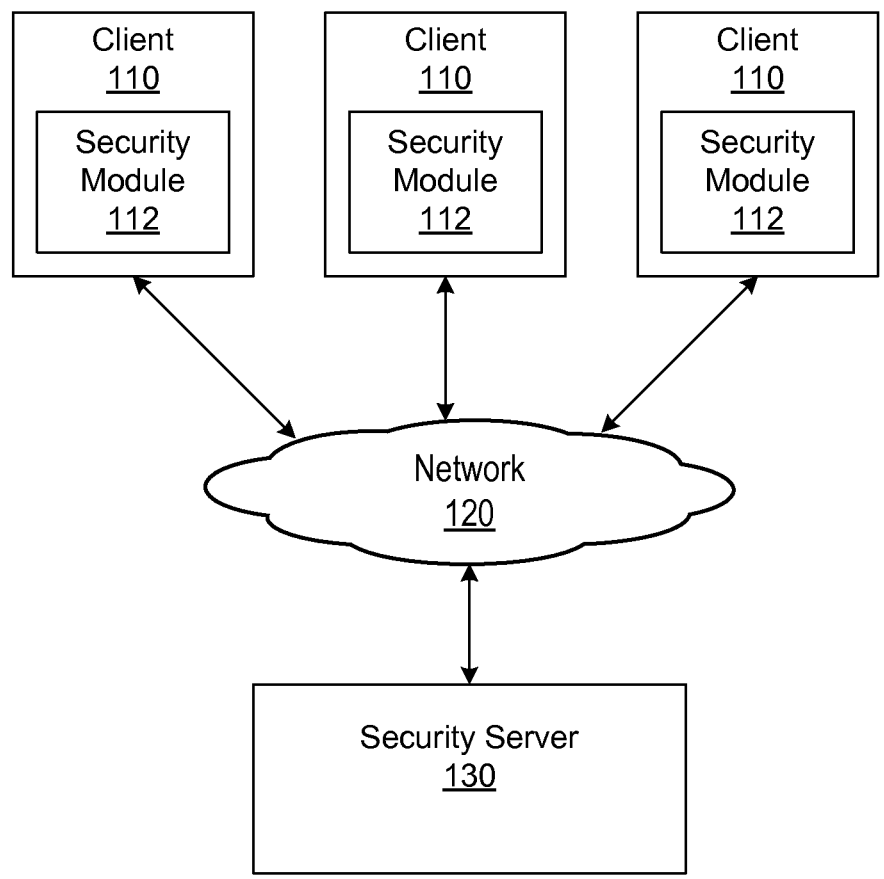
FIG. 1 is a high-level block diagram of a computing environment for selectively trusting signed files according to one embodiment.

FIG. 1 is a high-level block diagram of a computing environment 100 for selectively trusting signed files according to one embodiment. FIG. 1 illustrates a security server 130 and three clients 110 connected by a network 120. The illustrated environment 100 represents a typical computing environment where multiple clients 110 interact with the security server 130 to identify and remediate malware at the clients 110. Only three clients 110 are shown in FIG. 1 in order to simplify and clarify the description. Embodiments of the computing environment 100 can have many clients 110 and security servers 130 connected to the network 120.

The client 110 is used by a user to interact with the security server 130 and/or other entities on the network 120. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways that encounter software applications or other entities that might constitute malware or other threats. For example, a client 110 can be a network gateway located between an enterprise network and the Internet.

The client 110 executes a security module 112 that provides security to the client 110 by detecting and remediating malware and performing other security-related tasks. The security module 112 detects files at the client 110 and provides identifiers of the files to the security server 130. In addition, the security module 112 determines whether files at the client contain malware. In one embodiment, if the security module 112 encounters a file with a valid digital signature, the security module 112 provides an identifier of the signed file, and associated signing information describing the digital signature, to the security server 130. In response, the security module 112 receives from the security server 130 trust data indicating a level of trust to give the signed file. The security module 112 uses the trust data to determine whether the signed file contains malware.

The security server 130 interacts with the clients 110. One or more of the functions of the security server 130 can also be executed in a cloud computing environment. As used herein, cloud computing refers to a style of computing in which dynamically scalable and often virtualized resources are provided as a service over the Internet.

The security server 130 receives the file identifiers and signing information from the clients 110. In one embodiment, the security server 130 uses the file identifiers to establish a list of discovery dates indicating when files were first detected at the clients 110. In addition, the security server 130 maintains a list of compromised digital signing certificates (e.g., a list of certificates that have been revoked and/or used to sign known malware). Certificates in the list have an associated compromise date indicating when the certificates were compromised.

Upon receiving signing information and a file identifier for a signed file detected at a client 110, the security server 130 determines whether the certificate used to sign the file is compromised. If so, the security server 130 also determines the discovery date of the identified file. If the discovery date of the file predates the compromise date, then the file was discovered (and signed) before the certificate was compromised. Therefore, the security server 130 sends the client 110 trust data indicating to provide a high level of trust to the signed file. In contrast, if the discovery date of the file postdates the compromise date, then the file was signed after the certificate was compromised and therefore is likely to contain malware. Accordingly, the security server 130 sends the client 110 trust data indicating to provide a low level of trust to the signed file. If the discovery date falls on or around the compromise date, then an embodiment of the security server 130 sends the client 110 trust data indicating to provide a middle level of trust to the signed file. The client can use the intermediate trust level to provide extra scrutiny to a possibly-malicious program when, e.g., the compromise date is uncertain.

The network 120 enables communications among the clients 110 and the security server 130 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
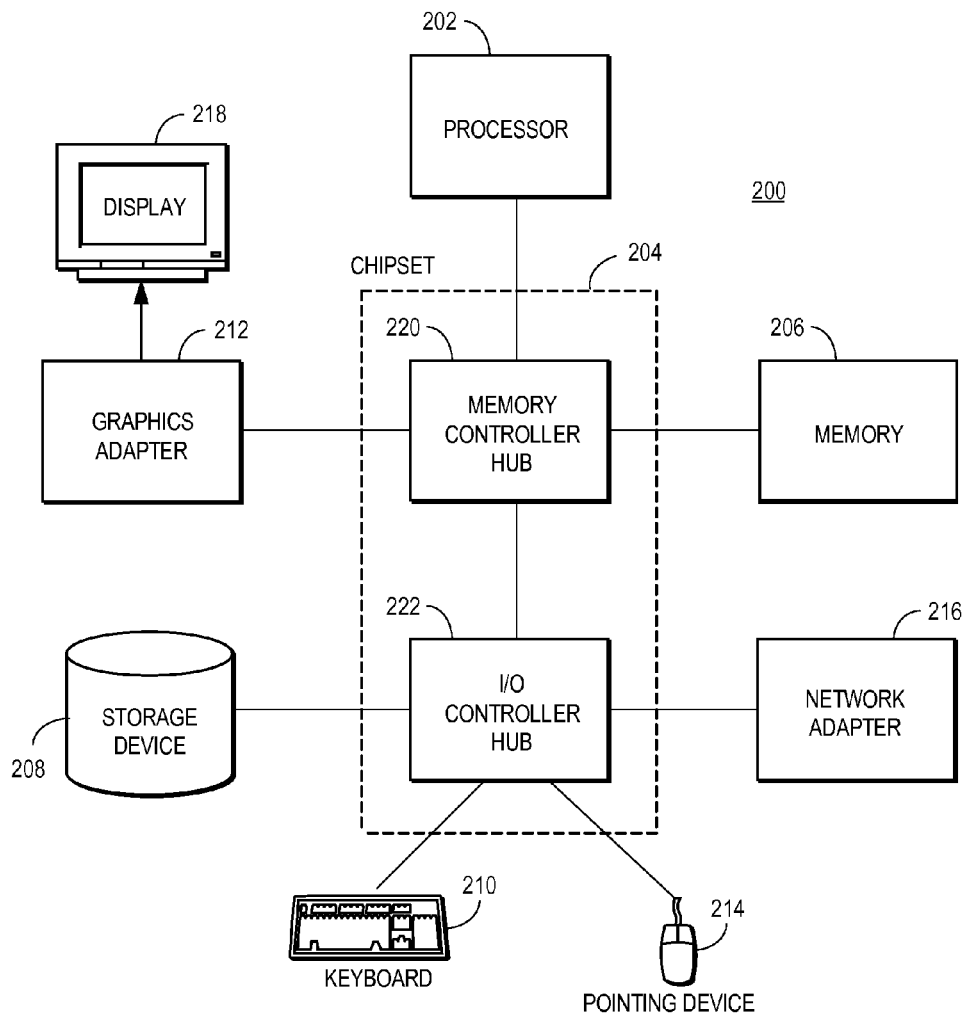
FIG. 2 is a high-level block diagram illustrating a typical computer for use as a security server or a client.

FIG. 2 is a high-level block diagram of a computer 200 for acting as a client 110 and/or as a security server 130. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device and stores files. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a security server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
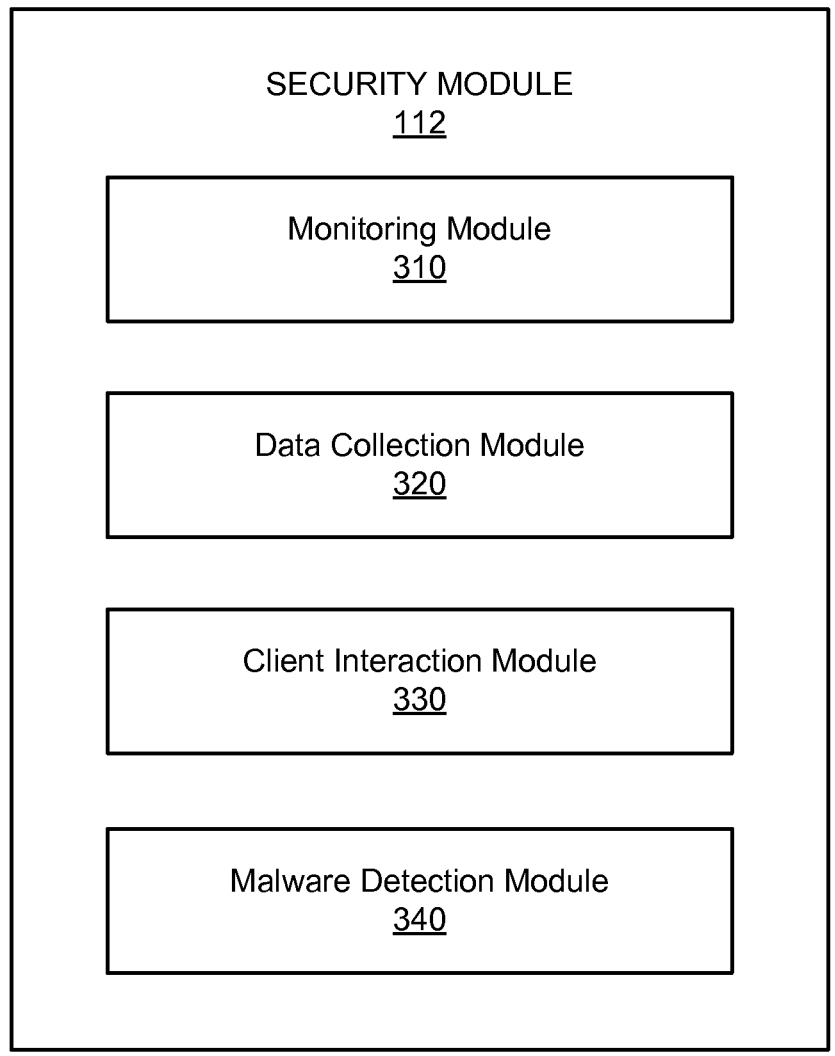
FIG. 3 is a high-level block diagram illustrating a detailed view of a security module of a client according to one embodiment.

FIG. 3 is a high-level block diagram illustrating a detailed view of a security module 112 of a client 110 according to one embodiment. In some embodiments, the security module 112 is incorporated into an operating system executing on the client 110 while in other embodiments the security module 112 is a standalone application or part of another product. Those of skill in the art will recognize that other embodiments of the security module 112 can have different and/or other modules than the ones described here, and that the functionalities can be distributed among the modules in a different manner.

A monitoring module 310 monitors the client 110 to detect files. Files typically arrive at the client 110 via the network 120 and are stored on the storage device 208. The monitoring module 310 can detect the files using a variety of techniques, such as by scanning the storage device 208 to identify the files stored therein, monitoring activities on the client 110 to detect the creation of a new file on the storage device, and/or by monitoring network traffic to detect a file being received by the client 110. The monitoring module 310 can detect both signed and unsigned files. In addition, in some embodiments the monitoring module 310 detects only certain types of files, such as files in the portable executable format.

A data collection module 320 collects data about the detected files. In one embodiment, the data collection module 320 identifies the date (including the time) when the file was first detected at the client 110. In addition, the data collection module 320 generates file identifiers for detected files. The file identifier is a value that uniquely identifies a file. In one embodiment, the data collection module 320 uses a variant of the Secure Hash Algorithm (SHA) to generate the identifier for a file.

In addition, the data collection module 320 collects signing information for valid signed files (i.e., files having valid digital signatures). The signing information describes a file's signature and includes information identifying the certificate used to sign the file. In one embodiment, the signing information specifies the identity of the root certificate authority from which the certificate's trust ultimately depends, the identity of the issuer authority that issued the signing certificate to the signer, and the identity of the signer that used the certificate to sign the file. The signing information can include different and/or additional information in other embodiments.

A client interaction module 330 sends reports containing data collected by the data collection module 320 to the security server 130. In one embodiment, the client interaction module 330 sends reports containing file identifiers of all files detected at the client 110 to the security server 130. Furthermore, an embodiment of the client interaction module 330 sends reports containing the signing information and associated file identifiers for signed files detected at the client 110 to the security server 130.

The client interaction module 330 can send the reports at various times depending upon the embodiment. The client interaction module 330 can send a report for a file when the file is initially detected at the client 110. The client interaction module 330 can also send multiple reports in batch at scheduled or other times, such as when there is low resource utilization at the client 110. Further, in one embodiment, the client interaction module 330 sends a report for a file as part of a request for trust data associated with the file. For example, the client interaction module 330 can send a report describing a signed file as part of a request for trust data associated with the file. The client interaction module 330 can also send additional data reports to the security server 130 describing other events occurring at the client 110, such as malware detections.

The client interaction module 330 also receives information from the security server 130. The received information includes trust data indicating a level of trust that the security module 112 should give a file detected at the client 110. The received information can also include other security-related information, such as malware signatures for detecting malware in files at the client 110, reputation data describing reputations of files, network hosts, and/or other entities, and the like.

A malware detection module 340 uses the trust data and/or other information received from the security server 130 to detect and remediate malware at the client 110. When determining whether a signed file contains malware, the malware detection module 340 gives the file a level of trust determined based on the received trust data. Generally, the higher the level of trust for a file, the less likely the file is to contain malware. Thus, the malware detection module 340 can grant complete trust to a file having the highest trust level by adding it to a whitelist of known legitimate files. Conversely, the malware detection module 340 can automatically convict a file having the lowest level of trust as malware and add it to a blacklist of known malware. For files having trust levels between the two extremes, the malware detection module 340 can evaluate other characteristics of the file, such as the file's behaviors, in combination with the trust level to determine whether the file contains malware. Further, an embodiment of the malware detection module 340 remediates detected malware by performing actions such as quarantining or deleting the file containing the malware. Likewise, the malware detection module 340 can report the malware detection to a user of the client 110.

Figure 4:
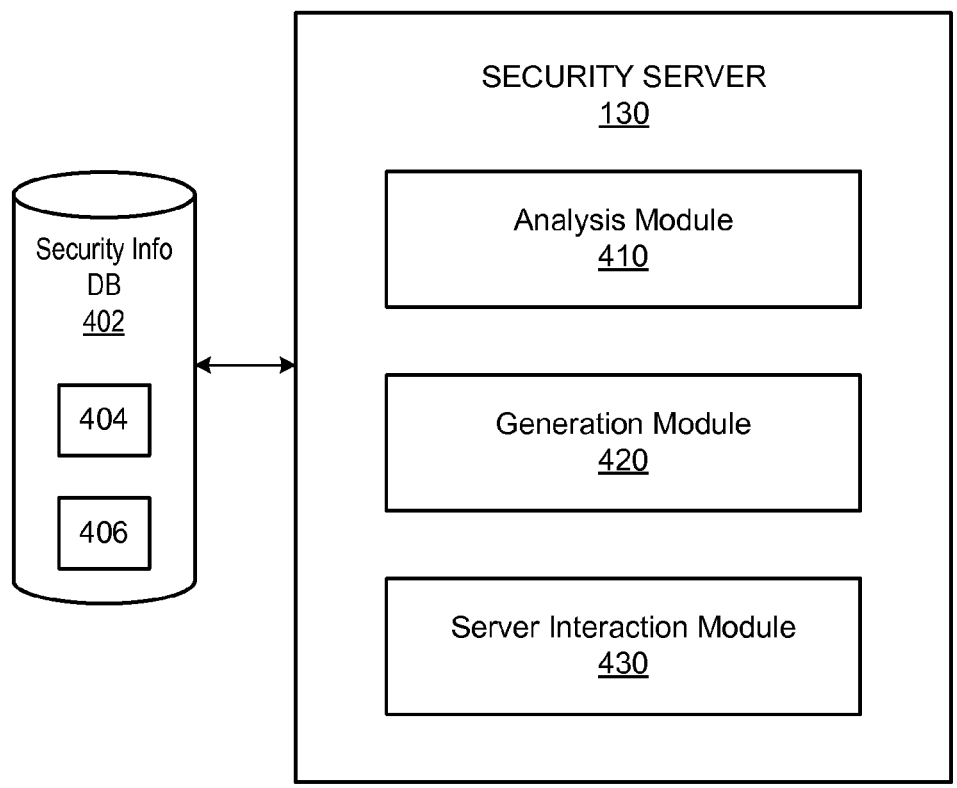
FIG. 4 is a high-level block diagram illustrating a detailed view of the security server according to one embodiment.

FIG. 4 is a high-level block diagram illustrating a detailed view of the security server 130 according to one embodiment. Those of skill in the art will recognize that other embodiments of the security server can have different and/or other modules than the ones described here, and that the functionalities can be distributed among the modules in a different manner. The modules of the security server 130 store and/or retrieve data from a security information database 402. Embodiments of the security information database 402 can store different and/or additional information than described herein.

In one embodiment, the security information database 402 stores a list of compromised signing certificates 404. A certificate is said to be "compromised" when it is no longer trusted as a signal that software signed using the certificate is legitimate. A certificate can be compromised if it is observed that the certificate was used to sign known malware. This sort of compromise might occur, for example, if the certificate was issued to a legitimate signer but then stolen and used by a malicious entity. Additionally, a certificate can be compromised if it is observed that the party to whom the certificate was issued is malicious or suspicious. For example, an issuing certificate authority might discover that the entity to whom a certificate was issued submitted false information when obtaining the certificate. In this case, software signed with the certificate cannot be trusted because the true identity of the signer cannot be ascertained.

The list 404 of compromised certificates also specifies details of the certificates, such as the root certificate authority, issuer certificate authority, and signer to whom the certificate was issued. Moreover, the list 404 includes a compromise date associated with each certificate that indicates when the certificate became compromised. In one embodiment, the compromise date indicates the most recent date that the certificate was known to have been used to sign a legitimate file. The compromise date can be based on other events in other embodiments, such as the earliest date that the certificate was known to have been used to sign malware.

The list of compromised certificates 404 can be populated manually and/or automatically. For example, an operator of the security server 130 can manually add compromised certificates to the list 404. Likewise, the security server 130 can add compromised certificates to the list 404 based on data observed about signed files in reports from the clients 110 and/or from other sources.

In addition, the security information database 402 stores a list of discovery dates 406. A discovery date indicates when a file, identified by its file identifier, was first found on any of the clients 110 connected to the security server 130. Since there are a large number of clients 110 in one embodiment, the discovery date for a given file will usually be close to when the file was first released to the public. In one embodiment, the discovery date is based on the discovery date contained in a report from the client 110. In another embodiment, the discovery date is based on the date that the report was received by the security server 130. This latter embodiment reduces the possibility of an attacker manipulating the list of discovery dates by submitting false reports. The discovery date may also be based on other criteria, such as the date when a threshold number of clients 110 have reported the signed file. In one embodiment, the discovery date list 406 is generated automatically by the security server 130 based on reports received from the clients 110 and/or from other sources. The discovery date list 406 is updated as clients 110 report new files to the security server 130.

Turning now to the modules within the security server 130, an analysis module 410 analyzes reports describing signed files received from the clients 110 to determine whether the signatures can be trusted. The analysis module 410 obtains the file identifier for a signed file and also the associated signing information from a report received from a client 110. As mentioned above, the signing information identifies the root and issuer authorities for the certificate, and also the signer to whom the certificate was issued.

In one embodiment, the analysis module 410 uses the signing information in the report to determine whether the certificate used to sign the file is on the list of compromised certificates 404 by matching the root, issuer, and signer information. If the certificate is on the list 404, the analysis module 410 determines whether the file was initially discovered before the certificate was compromised. For this latter determination, the analysis module 410 looks up the file identifier in the report in the list of discovery dates 406 stored in the security information database 402 to determine the discovery date for the file. The analysis module 410 compares the discovery date with the compromise date associated with the certificate in the list of compromised certificates 404. In the embodiment where the compromise date indicates the most recent date that the certificate was known to have been used to sign legitimate software, the analysis module 410 determines whether the discovery date is equal to or prior to that date.

A generation module 420 generates trust data based on the analysis performed by the analysis module 410. Since the trust data indicate the level of trust to give a signed file, the generation module 420 generates trust data indicating a high level of trust for a file signed by a certificate that has not been compromised (i.e., by a certificate not on the list of compromised certificates 404). In this instance, the presence of the certificate in the valid signature indicates that the file was signed by an identified entity and has not been modified since signing. Therefore, the file can be trusted to not contain malware.

Even if the certificate has been compromised, an embodiment of the generation module 420 generates trust data indicating high level of trust if the discovery date of the signed file is prior to when the certificate was compromised. In this situation, the file was signed before the certificate was compromised and has not been modified since signing. Therefore, the file is afforded the same level of trust it would receive if the certificate were not compromised.

However, if the certificate has been compromised, and the file was discovered after the date of the compromise, an embodiment of the generation module 420 generates trust data indicating a low level of trust for the file. Here, the file was discovered after the file was known to have been compromised. Accordingly, there is a high likelihood that the file was created and signed by a malicious entity and contains malware (since a legitimate holder of the certificate would be unlikely to sign software using a known compromised certificate). Additionally, if the discovery date falls on or near the compromise date (e.g., within a few days of the compromise date), the generation module 420 may generate trust data indicating a medium level of trust for the file. Here, the medium level of trust reflects possible uncertainty in the compromise date and/or addresses situations where a legitimate file was signed using the certificate on approximately the same date that the certificate was compromised.

The server interaction module 430 interacts with the security modules 112 of the clients 110 to provide the trust data. The server interaction module 430 can also provide additional information, such as reputations of files, websites, and other entities, and signatures and heuristics that can be used by the security modules 112 to detect malware at the clients 110.

Figure 5:
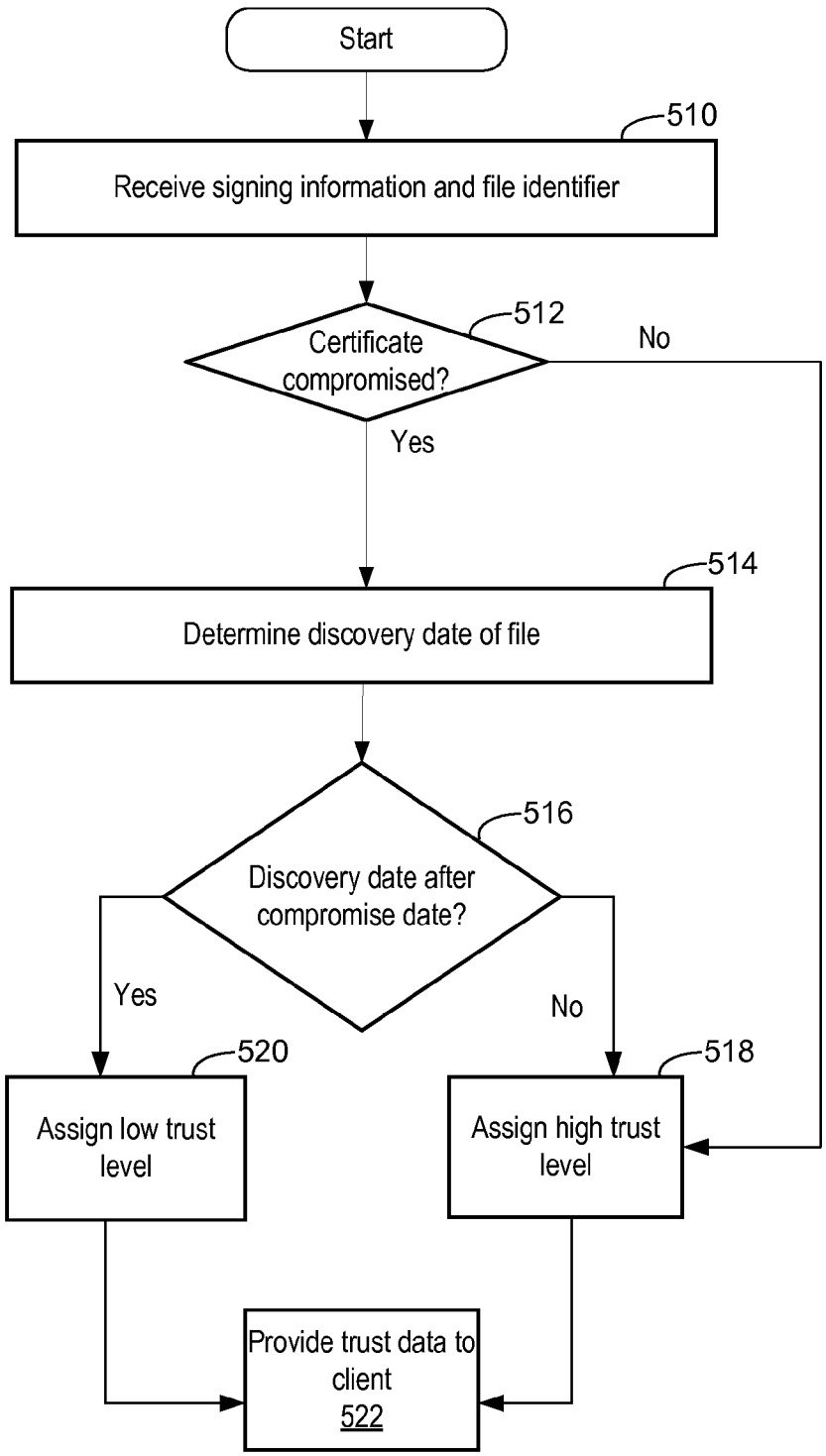
FIG. 5 is a flowchart illustrating steps performed by the security server to analyze a signing certificate and provide trust data to a client according to one embodiment.

FIG. 5 is a flowchart illustrating steps performed by the security server 130 to analyze a signing certificate and provide trust data to a client 110 according to one embodiment. Other embodiments perform the illustrated steps in different orders, and/or perform different or additional steps. Moreover, some of the steps can be performed by entities other than the security server 130.

The security server 130 receives 510 a report from a client 110 containing signing information and an associated file identifier identifying a signed file detected at the client. The security server 130 analyzes 512 the signing information to determine whether the certificate used to sign the file is compromised. In one embodiment, the security server 130 performs this analysis by determining whether the certificate is on a list of compromised certificates 404. If 512 the certificate is not on the list 404, the security server 130 generates 518 trust data indicating that the client 110 should give the signed file a high level of trust.

If 512 the certificate is on the list of compromised certificates 404, the security server 130 determines the date of the compromise and also determines 514 the discovery date of the identified file. In one embodiment, the security server 130 determines the discovery date by consulting a list of file discovery dates 406. If 516 the discovery date of the signed file is after the compromise date, the security server 130 generates 520 trust data indicating that the client 110 should give the signed file a low level of trust because the file is likely to contain malware. If 516 the discovery date of the file is not after the compromise date, the security server 130 generates 518 trust data indicating that the client 110 should give the signed file a high level of trust because the file was discovered and signed before the certificate was compromised. In one embodiment, if the discovery date of the file is near the compromise date, the security server 130 generates trust data indicating that the client 110 should give the signed file an intermediate level of trust. The security server 130 provides 522 the trust data to the client 110.

Depending upon the embodiment, a portion of the analysis described in FIG. 5 can be performed by the security module 112 of the client 110. The security module 112 can contact the security server 130 in order to obtain the information stored in the security information database 402 and evaluate the information to determine the level of trust to give the signed file.

Thus, the techniques described above allow selective trust of certificates based on the discovery date of a signed file and the date that the certificate was compromised. If the discovery date of the signed file is after the date of compromise, the signed file is assigned a low trust level. If, on the other hand, the discovery date is before the date of compromise, the signed file is assigned a high trust level as if the certificate was not compromised. Intermediate levels of trust can also be assigned to files with discovery dates marginally earlier or later than the date of compromise. Assigning an intermediate level of trust can mitigate the number of false negatives and positives produced when the known date of compromise is not precise.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of assigning a trust level to a digitally-signed file, comprising:
   receiving, at a computer, signing information identifying a certificate used to sign the file;
   determining, by the computer, whether the certificate is compromised;
   responsive to determining that the certificate is compromised, comparing, by the computer, a discovery date of the file with a compromise date of the certificate; and
   generating, by the computer, trust data assigning the trust level to the file responsive to the comparison, the generating comprising:
      generating trust data assigning an intermediate trust level to the file responsive to the comparison of the compromise date with the discovery date indicating that the discovery date is within a threshold amount of time before or after the compromise date;
      generating trust data assigning a low trust level to the file responsive to the comparison of the compromise date with the discovery date indicating that the file discovery date is past the threshold amount of time after the compromise date; and
      generating trust data assigning a high trust level to the file responsive to the comparison of the compromise date with the discovery date indicating that the file discovery date is prior to the threshold amount of time before the compromise date.

2. The method of claim 1, wherein the signing information is received from a client on which the file is detected, the trust data are provided to the client, and the client is adapted to use the trust data to determine whether the file contains malware.

3. The method of claim 1, wherein determining whether the certificate is compromised comprises:
   determining whether the certificate is listed on a list of compromised certificates.

4. The method of claim 1, wherein the comparing comprises:
   determining the compromise date for the certificate, the compromise date indicating when the certificate became compromised;
   determining the discovery date of the file, the discovery date indicating when the file was first discovered on one or more of a plurality of clients; and
   comparing the compromise date with the discovery date.

5. The method of claim 4, wherein the compromise date indicates a most recent date that the certificate was known to have been used to sign a legitimate file.

6. A non-transitory computer-readable storage medium storing executable computer program instructions for assigning a trust level to a digitally-signed file, the instructions comprising instructions for:
   receiving signing information identifying a certificate used to sign the file;
   determining whether the certificate is compromised;
   responsive to determining that the certificate is compromised, comparing a discovery date of the file with a compromise date of the certificate; and
   generating trust data assigning the trust level to the file responsive to the comparison, the generating comprising:
      generating trust data assigning an intermediate trust level to the file responsive to the comparison of the compromise date with the discovery date indicating that the discovery date is within a threshold amount of time before or after the compromise date;
      generating trust data assigning a low trust level to the file responsive to the comparison of the compromise date with the discovery date indicating that the file discovery date is past the threshold amount of time after the compromise date; and
      generating trust data assigning a high trust level to the file responsive to the comparison of the compromise date with the discovery date indicating that the file discovery date is prior to the threshold amount of time before the compromise date.

7. The computer-readable medium of claim 6, wherein the signing information is received from a client on which the file is detected, the trust data are provided to the client, and the client is adapted to use the trust data to determine whether the file contains malware.

8. The computer-readable medium of claim 6, wherein determining whether the certificate is compromised comprises:
   determining whether the certificate is listed on a list of compromised certificates.

9. The computer-readable medium of claim 6, wherein the comparing comprises:
   determining the compromise date for the certificate, the compromise date indicating when the certificate became compromised;
   determining the discovery date of the file, the discovery date indicating when the file was first discovered on one or more of a plurality of clients; and
   comparing the compromise date with the discovery date.

10. The computer-readable medium of claim 9, wherein the compromise date indicates a most recent date that the certificate was known to have been used to sign a legitimate file.

11. A computer for assigning a trust level to a digitally-signed file, comprising:
   a non-transitory computer-readable storage medium storing executable computer program instructions comprising instructions for:
      receiving signing information identifying a certificate used to sign the file;
      determining whether the certificate is compromised;
      responsive to determining that the certificate is compromised, comparing a discovery date of the file with a compromise date of the certificate; and
      generating trust data assigning the trust level to the file responsive to the comparison, the generating comprising:
         generating trust data assigning an intermediate trust level to the file responsive to the comparison of the compromise date with the discovery date indicating that the discovery date is within a threshold amount of time before or after the compromise date;
         generating trust data assigning a low trust level to the file responsive to the comparison of the compromise date with the discovery date indicating that the file discovery date is past the threshold amount of time after the compromise date; and
         generating trust data assigning a high trust level to the file responsive to the comparison of the compromise date with the discovery date indicating that the file discovery date is prior to the threshold amount of time before the compromise date; and
   a processor for executing the computer program instructions.

12. The computer of claim 11, wherein the signing information is received from a client on which the file is detected, the trust data are provided to the client, and the client is adapted to use the trust data to determine whether the file contains malware.

13. The computer of claim 11, wherein determining whether the certificate is compromised comprises:
   determining whether the certificate is listed on a list of compromised certificates.

14. The computer of claim 11, wherein the comparing comprises:
   determining the compromise date for the certificate, the compromise date indicating when the certificate became compromised;
   determining the discovery date of the file, the discovery date indicating when the file was first discovered on one or more of a plurality of clients; and
   comparing the compromise date with the discovery date.

15. The computer of claim 14, wherein the compromise date indicates a most recent date that the certificate was known to have been used to sign a legitimate file.

* * * * *